Nov. 7, 1950     H. G. LYKKEN     2,529,301
APPARATUS FOR MAKING ENDLESS V-BELTS
Filed Oct. 14, 1946     4 Sheets-Sheet 1

INVENTOR
HENRY G. LYKKEN
BY Paul, Paul & Moore
ATTORNEYS

Nov. 7, 1950   H. G. LYKKEN   2,529,301
APPARATUS FOR MAKING ENDLESS V-BELTS
Filed Oct. 14, 1946   4 Sheets-Sheet 2

INVENTOR
HENRY G. LYKKEN
BY Paul, Paul & Moore
ATTORNEYS

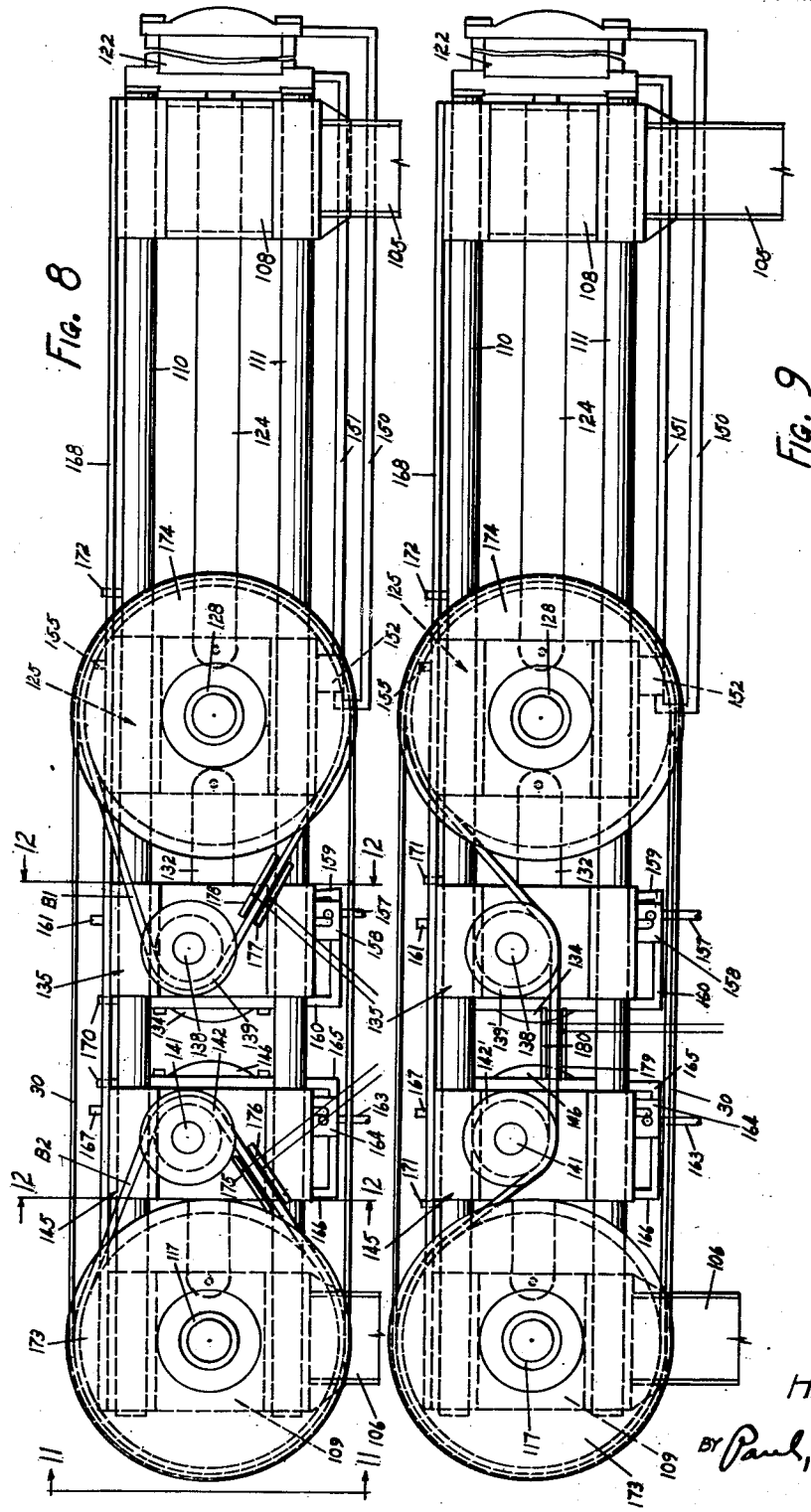

Nov. 7, 1950     H. G. LYKKEN     2,529,301
APPARATUS FOR MAKING ENDLESS V-BELTS
Filed Oct. 14, 1946     4 Sheets-Sheet 4
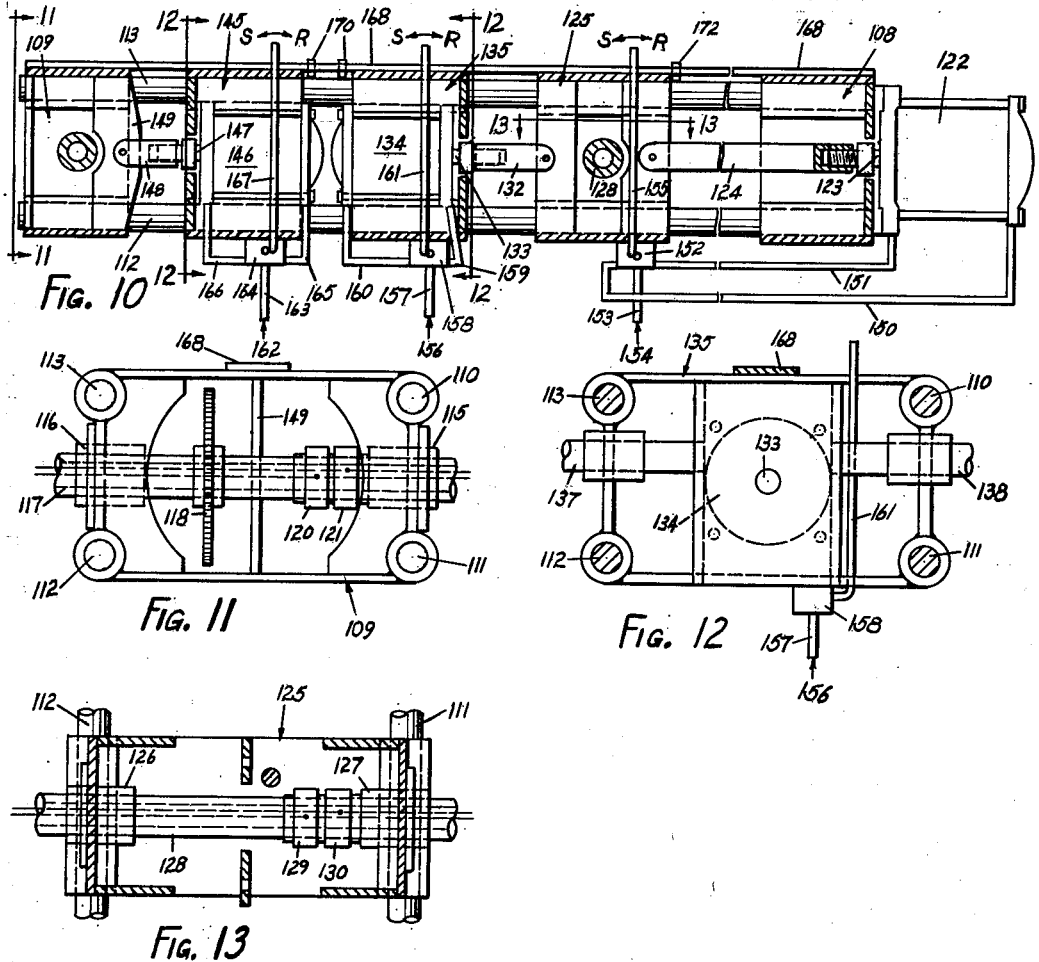
INVENTOR
HENRY G. LYKKEN
BY Paul, Paul & Moore
ATTORNEYS Patented Nov. 7, 1950

2,529,301

UNITED STATES PATENT OFFICE 2,529,301

APPARATUS FOR MAKING ENDLESS V-BELTS

Henry G. Lykken, Minneapolis, Minn.

Application October 14, 1946, Serial No. 703,139

12 Claims. (Cl. 154—3)

This invention relates to an apparatus and method for producing endless belts that are composed of heat curable material. The most common application to which the invention is applied and which is described herein as illustrative of the invention is the manufacture of endless V-belts composed of heat vulcanizable rubber, cord and fabric construction. Heretofore, the manufacture of V-belts has been carried out by preliminarily forming a belt from its constituent parts of cord, fabric and rubber composition, after which the uncured belts are molded in one or the other of two ways. For the shorter sizes of belts the uncured belts are placed upon multiple ring or drum molds and the molds with a number of belts upon them are placed in a retort and cured under heat and pressure. For the larger sizes, the belts are cured a part of the circumference at a time in successive steps. In this method a portion of the uncured belt is placed in a straight or curved mold of appropriate cross section and heat and pressure is applied to vulcanize that section. The mold is then opened and the belt is then moved so as to bring another uncured portion of the belt in the mold. The mold is then reclosed and the second portion vulcanized. The process is repeated until the entire periphery of the belt is vulcanized.

While this method is comparatively satisfactory and many belts have been made that way, it has a disadvantage that the belts must be removed, reclamped and cured at several positions around the circumference of the belt in order to complete the molding operation. This not only consumes a great deal of labor and time, as well as machine time, but also produces areas of overlapping vulcanization, for the portions of the circumference vulcanized must be overlapped in order to be certain that no section of the belt is uncured. Accordingly, there are some portions of the circumference which are cured more than others and hence the belt does not have quite the same flexibility all around.

A further disadvantage of each of the foregoing conventional methods has particular reference to the use of a plurality of belts in multiple or, as it is known, in multiple V-belt drives. When multiple V-belts are used, it is necessary to match the belts exactly for length for if one of the belts is tighter than the remaining belts, it will assume a disproportionately large share of the load with detrimental results. Heretofore, it has been necessary to "match" the belts for length after they have been completely manufactured in order to obtain "sets" of even reasonably corresponding length. This has been especially difficult because in both of the conventional methods the belts are molded without any stress being placed upon the load-carrying cords of the belt. Hence, belts made in accordance with prior methods have a high percentage of residual stretch which is non-uniform from belt to belt. Hence, use of such conventional belts in multiple has been subject to the disadvantage of non-uniform loading.

Another disadvantage of prior methods of V-belt manufacture involves the fact that each belt had to be preliminarily formed to the approximate configuration of the V cross section prior to molding. This has necessitated an individual handling of the belts during manufacturing.

It is an object of the invention to provide an improved method and apparatus for manufacturing endless belts of heat curable material and more particularly to provide improved methods and apparatus for manufacturing V-belts. It is also an object of the invention to provide improved methods and apparatus capable of yielding highly finished, dimensionally accurate belts quickly and at low cost as compared to prior methods and to permit manufacture of the V-belt assemblies prior to curing by multiple methods. It is also an object of the invention to provide improved methods and apparatus for simultaneously molding a plurality of belts under identical conditions so as to provide belts of identical cross section and length.

Other and further objects of the invention are those inherent in the apparatus herein illustrated, described and claimed.

The method of the invention is illustrated with reference to the apparatus of the invention, the latter being shown in the drawings in which Figure 1 is a top elevational view of one form of machine for carrying out the method of the invention.

Figures 8 and 9 are side elevational views of a modified form of the invention used for simultaneous manufacture of a plurality of long or short belts. Figure 8 illustrates the manufacture of a plurality of short belts, whereas Figure 9 illustrates the manufacture of a plurality of long belts.

Figure 10 is a longitudinal sectional view of the apparatus shown in Figures 8 and 9, illustrating the operating mechanism.

Figure 1:
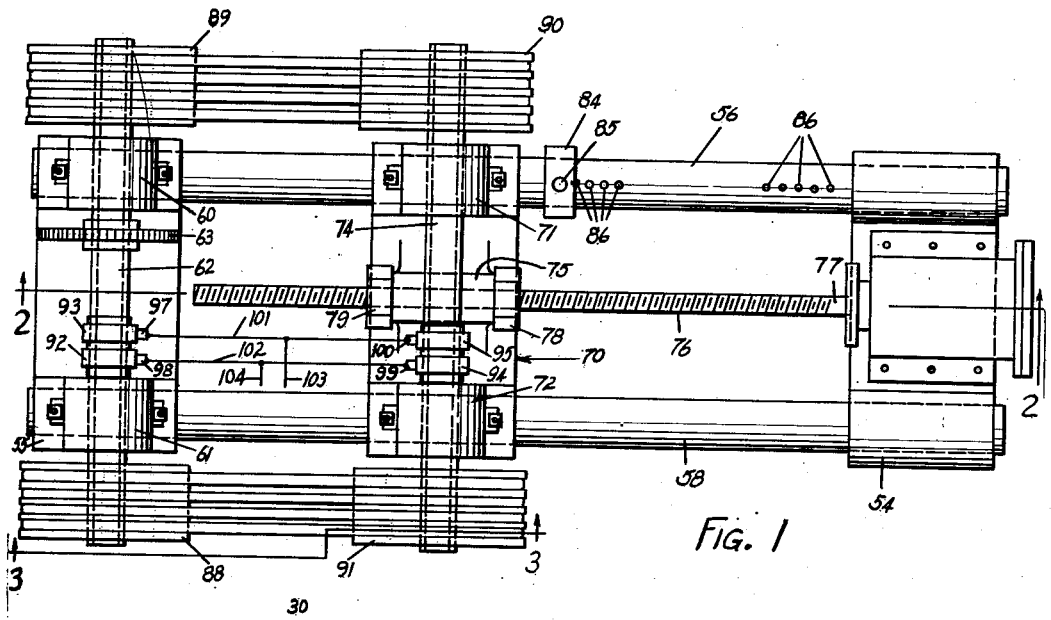

Figures 11 and 12 are transverse sectional views taken in the direction of arrows 11—11 and 12—12 in Figures 8 and 10, with certain parts of the apparatus removed for purposes of clarity.

Figure 13 is a fragmentary transverse plan sectional view in the direction of arrow 13 of Figure 10.

Throughout the drawings corresponding numerals refer to the same parts.

In carrying out the method of the invention a belt is first prepared from its component parts which, as customarily manufactured, consists of a cord or fabric core 10, Figures 4–7, embedded in a rubber matrix 11. Above the cord section there is a rubber filler section 12 and below it a heavy rubber pad section 13. In this stage the rubber is uncured and around the uncured endless belt so formed there is usually placed a rubber impregnated cloth cover 15.

In the foregoing description and throughout the specification and claims hereinafter included, the term "rubber" will be understood to include natural or synthetic rubbers or elastomers or plastic elastomers capable of being cured with heat and/or pressure to form a tough resilient flexible and wear-resistant body. The most common of such compositions are natural rubber compositions, synthetic rubber compositions and certain plastics. The rubber compositions, of course, include the usual fillers, extenders, mold lubricants, accelerators, etc., as is well known in the rubber art. Wherever the term "heat curable material" is herein included, it is intended to mean any of the foregoing rubber or plastic containing compositions capable of being cured with heat and/or pressure.

In carrying out the method of the present invention it is quite feasible to fabricate the core of the belt consisting of pieces 13, 10 and 12 as a wide flat band upon a forming drum. The circumference of the drum accordingly establishes in a general way the circumferential dimensions of the belt utimately formed, but the width of the preliminary uncured built-up structure may be as wide as many belts placed side to side. Hence, the thick pad layer 13, the cord carrying layer 10—11 and the superimposed layer 12 may be much wider than the belt ultimately formed. After the various layers are built up on the forming drum, they may be severed into bands by holding a cutter-knife against the built up layers as the drum is rotated. Thus, separate bands of uncured material of substantially rectangular cross section may easily be produced. If desired, bottom and top layers of cloth may be used on the built up uncured structure. After severing the uncured built up structure into bands they are removed from the forming drum and either used directly or wrapped with a rubber impregnated cloth which is attached to the band and worked over its entire surface and temporarily held in place due to the tackiness of the uncured rubber.

It may be pointed out at this juncture that the cross section of the uncured belt thus made is of generally rectangular shape, but, if desired, the uncured belt may be made up so as to have a cross sectional area at least approximately the same as that of the finished belt to be produced, although this involves a certain amount of skiving which is undesirable from the labor and cost standpoints, although not more so than has previously been the practice.

The next step in the process is the shaping and curing of the belt, and in accordance with the present invention this is accomplished by running a plurality of belts in multiple in specially grooved multiple groove pulleys whilst heating the belt and applying band pressure to force the heated and softened belt into the pulley grooves, and then after vulcanization has been partially completed or while it is in process, tensioning the belt to achieve the designed cord tension in the belt. The pulleys on which the belts are run have grooves therein which are parallel walled to a prescribed depth and have bottom cross sectional shapes of the size and configuration of the belt desired to be produced.

Figures 3 through 7 are schematic views showing one groove of each of a pair of curing wheels (Figure 3) and the manner in which the belt is placed in the grooves (Figure 4) and progressively shaped (Figures 5–7) during processing. It is to be understood, however, that the processing of the belts is carried out in multiple with many belts run side by side during curing.

Figure 3:
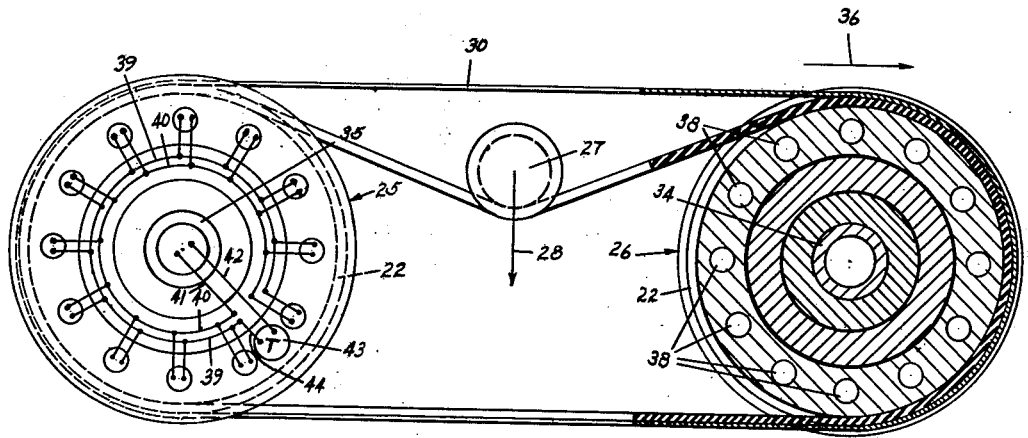
Figure 3 is a schematic fragmentary sectional view of a portion of the apparatus of Figure 1, partly in section, taken in the direction of arrows 3—3 of Figure 1.
Figures 4, 5, 6, 7:
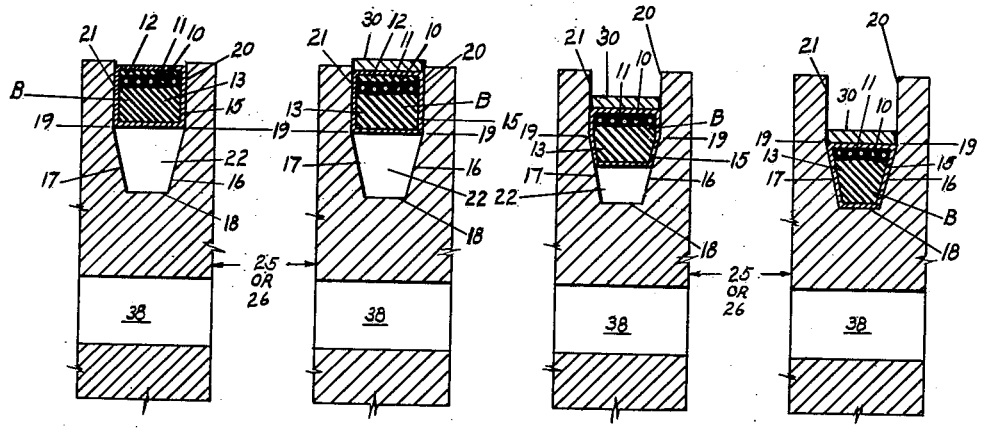
Figures 4, 5, 6 and 7 are sectional views of the belt in place on the carrying pulleys of the apparatus of the invention showing succesive stages of forming and curing the belt.

In Figures 4–7, which represent one groove of the multiple groove belt curing pulleys, the bottom cross sectional shape defines the cross section of the belt being produced and is the area 22 bounded by the converging walls 16 and 17, the bottom 18 and the line 19—19 which is the upper limit of the outwardly converging walls 16 and 17. Above the line 19—19 the walls are parallel as indicated at 20 and 21 and are spaced to permit the uncured belt blank to be dropped into place between the walls of the grooves in each of the pulleys. Figure 3 shows the pulleys 25 and 26 and represents two grooves of each of two multiple grooved pulleys. Each groove has a shape such as shown in Figures 4–7. The uncured belt enters the groove, but being of rectangular cross section or at least of a shape different from shape 22, it accordingly does not fit all the way down into the bottom portions 22 of the grooves. After each uncured belt, indicated at B in Figure 4, has been fitted into one of the grooves, there is placed over it a thin flexible endless belt or band 30. The band 30 has a width such that it fits nicely into the space between the walls 20 and 21. With the uncured belt B and the overlying thin flexible band 30 thus in place, the pulleys 25 and 26 are started rotating, and simultaneously the shafts 34 and 35 are moved away from each other relatively, as illustrated by the arrow 36 in Figure 3. It is usually convenient to fix one of the shafts 34 or 35 in permanent bearings and to mount the other shaft in bearings which are capable of being translated towards and away from the other shaft. The two pulleys are initially moved together to allow the uncured belt B and its band 30 to be placed into the groove and then are moved away under increasing tension as the rotation of the pulleys is begun. When this occurs the band 30, being substantially inextensible, rides deeper and deeper into the pulley grooves 22 and forces the uncured belt down gradually into the lower V-shaped portion 22 of the grooves. As a result the cross section of the belt is gradually changed from a rectangular cross section if the uncured belt had a cross section of rectangular shape, or changes any irregularities in a preliminarily V-shaped uncured belt to conform to the exact shape of the grooves 22. The progressive movement of the belt downward is illustrated in Figures 5, 6 and 7. In Figure 6 the belt has been pushed partly down and has begun to take the V-belt shape, whereas in Figure 7 the belt is pushed completely down and has the complete V-belt cross section defined by the walls 16, 17 and 18 and by the under side of the flexible band 30.

While the belt is thus being run down deeper and deeper into the groove and shaped, it is heated by any suitable means. Thus, the pulleys 25 and 26, or at least one of them, may be heated by any convenient heating arrangement, such as an electrical heater, steam, gas flame or the like, and, if desired, the belt may be additionally heated between the pulleys by a high frequency electrical dielectric heater or diathermy apparatus hereinafter described in greater detail. In Figure 3 the pulleys 25 and 26 are illustrated as being heated electrically. Thus, each of the pulleys has a plurality of electric heater cartridges 38 embedded in the solid portion of the pulley. The cartridge heaters 38 are each wired to bus bars 39 and 40. An incoming service connection 41 is connected to bus bar 40, whereas an incoming service connection 42 is connected through a thermostatic control switch 43 and thence through line 44 to the bus bar 39. The thermostatic switch 43 is mounted in the pulley and accordingly regulates the heat input in accordance with the temperature thereof.

The heating of the uncured belt softens it and makes easier the deformation required to change from the rectangular or roughly formed V of the uncured belt to the smooth and regular V of the finished belt. After the belt has been heated, softened and gradually run down into the pulley grooves and heated for a sufficient time, the heat curable material of the belt completely permeates the cords 10 and the cloth covering 15. The material in the cloth covering and in the deepest part of the groove is heated quickest and hence is the first to begin to cure and to become less plastic. At this time pulley 27 is moved downward as indicated by arrow 28, and the partially cured belt is tensioned with the result that cords in layer 10—11 are brought to design tension. The cords have little tendency, however, to pull into the pad section 13 because of the advanced curing and hence greater toughness of this section. Arrangement is made so as to stop the relative movement of the shafts 34 and 35 at a limiting position so as to limit the downward run of the thin flexible metallic bar 30 into the pulley groove space. In this way extrusion of the hot and somewhat plastic heat curable material around the band 30 in the slot is prevented. Similarly, only prescribed tension is placed on pulley 27, thus permitting the production of belts wherein the tension of the belt cords and its dimensions are accurately fixed and reproduceable.

Figure 2:
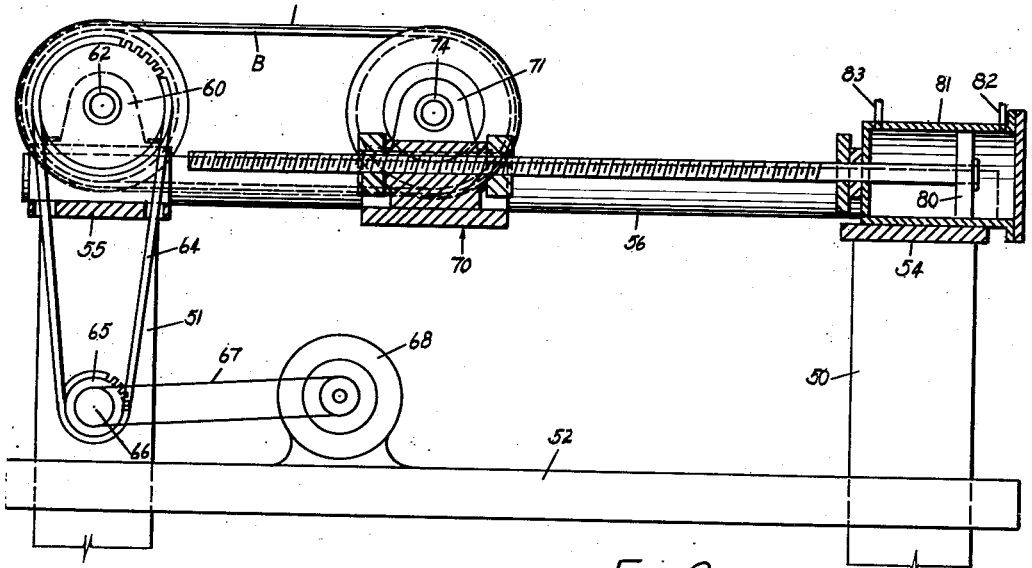
Figure 2 is a longitudinal sectional view taken in the direction of arrows 2—2 of Figure 1.

Referring to Figures 1 and 2 there is illustrated a production machine for carrying out a simplified form of the method of the invention wherein the belts are run down to shape them and are tensioned in one operation. The machine consists of frame posts 50 and 51 connected by a bottom frame member 52. The tops of the posts 50 and 51 terminate at blocks 54 and 55 which are apertured to receive a pair of round bars 56 and 58, extending horizontally between the frame posts. The upper frame block 55 is also provided with bearing seats 60 and 61 in which a tubular shaft 62 is journaled. The shaft is provided with a driving sprocket 63 which is connected by a chain belt 64 so as to run over a driving pinion 65 on the countershaft 66, the latter being driven by belt 67 from the motor 68. A variable speed drive of any conventional variety may be provided between the motor 68 and countershaft 66, if desired. Upon the parallel rods 56 and 58 there is mounted a cross head generally designated 70 which is provided with a pair of bearing blocks 71 and 72 for rotatably mounting the hollow shaft 74. Upon the cross head 70 there is also a central pillow block 75 which is apertured to receive the threaded end 76 of a piston rod 77. A pair of large nuts 78 and 79 upon the threaded end of the piston rod permits preliminary adjustment of the cross head 70 with reference to the piston rod for setting the apparatus to handle belts of different lengths. The piston rod 77 carries a piston 80 which moves back and forth in cylinder 81. The cylinder is provided with inlets 82 and 83 through which air or oil under pressure may be applied, if desired, for moving the piston 80 toward or away from the fixed shaft 62. Upon slide rod 76 there is mounted a stop collar 84 having a removable pin 85 which can be fitted into any one of a plurality of apertures 86 provided at spaced intervals along the rod 56. The stop collar 84 limits the movement of the cross head 70 toward the piston end of the machine and thus limits the downward running of the thin flexible band into the grooves of the pulleys, as previously described.

The ends of the shafts 62 and 74 extend beyond the bearing blocks 60, 61, 71 and 72, respectively, and upon the outer ends there are mounted pulleys 88, 89, 90 and 91. Each of the pulleys is illustrated as having four grooves, although many more grooves may be provided, if desired. The grooves in each instance have a bottom shape 22, Figure 4, of the belt cross sectional shape desired to be produced which may be a V-belt, if desired, or any other cross sectional shape, and above the bottom portion 22 the walls of the grooves are spaced and are parallel to each other. Each of the pulleys 88—91 is provided with electric heater elements as previously described for pulleys 25 and 26, Figure 3. The heater of pulleys 88 and 89 are wired to slip rings 92 and 93 on shaft 61, and the heaters of pulleys 90 and 91 are wired to the slip rings 94 and 95 on shaft 74. The slip rings are fed by brushes 97, 98, 99 and 100 which are in turn connected to the feeders 101 and 102 fed through service lines 103 and 104.

In operating the apparatus the nuts 78 and 79 are preliminarily adjusted so as to establish the piston 80 near the right-hand end of the cylinder 81 as shown in Figure 2 when the cross head 70 is against the stop collar 84, the stop collar having previously been adjusted so as to provide the belt size desired to be produced. The nuts 78 and 79 are then turned down tightly and air or other fluid under pressure is introduced through pipe 82 and the piston 80 is accordingly driven to the left, as shown in Figures 1 and 2. The uncured belts B are then laid in place on the pulleys 88—91 and 89—90, and over each belt there is placed a thin flexible metallic band 30. The air supply to line 82 is then interrupted and air is gradually introduced through pipe 83. This causes the piston 80 to be gradually moved to the right. At the same time the motor 68 is started. As the piston 80 moves to the right it drags cross-head 70 likewise, and this causes the flexible metallic bands 30 gradually to run down into the grooves of the pulleys and force the uncured belts deeper and deeper into the pulley grooves to shape them. As the belt is run down, heat is supplied by the heater elements of each pulley and this softens the rubber composition enabling it readily to conform to the shape of the pulley groove. The movement is soon arrested by the stop 84 which is positioned so as to hold the cross head when the thin flexible metallic bands 30 have pushed the belt material completely to the bottom of the grooves in which, in each case, the belt runs. The running is continued as heat is applied and after a suitable period the curing of the material is accomplished, after which the fluid supply to line 83 is interrupted and fluid is directed into line 82. This causes the cross head 70 to move to the left where the belts are loosened and can be removed.

Since the lower or pad portion 13 of the V-belts is heated and worked more than the upper portions 10—11 and 12, it is first to cure and it thus establishes a relatively firm base against which the cords in section 10—11 are tensioned when the cross-head 70 is moved to its limiting position. Accordingly, there is little tendency for the cords to pull downwardly into the pad. If desired, the pad 13 may be made of rubber composition having more accelerator and hence a shorter curing time than portions 10—11 and 12 so as to allow ample differential in the curing rates of the two sections. This permits the pad portion 13 to become quite firm as tension is applied to the cords in section 10—11 at the limit of movement of the cross-head.

It will be noted that in the foregoing operation a plurality of belts are cured simultaneously in each operation. The number may be greatly increased by providing a greater number of grooves in the pulleys. Furthermore the belts are cured to precisely the same dimensions, and the belts are accordingly dimensionally accurate both as to cross section and length and may be used in multiple in "multiple V-belt drives" without danger of overloading or underloading any of the belts.

Referring to Figures 8–13 there is illustrated a preferred form of the apparatus of the invention which, however, operates on the same principle as explained with reference to Figures 3–7. In these figures the frame of the machine consists of posts 105 and 106 which terminate in head boxes 108 and 109. In this machine the head boxes serve to support four parallel slide rods 110, 111, 112 and 113, Figure 12. The head box 109 is provided with journals 115 and 116 in which a hollow shaft 117 rotates. Shaft 117 is provided with a driving sprocket 118 (Figure 11) and at each of its outwardly protruding ends there is mounted a pulley 173 as described with reference to the apparatus shown in Figures 1–2, the pulley being provided with a plurality of belt-forming grooves. The shaft 117 is likewise provided with slip rings 120 and 121 which serve to conduct electricity to the heating elements of the belt-forming pulleys. Upon the head box 108 there is mounted a piston 122 having a piston rod 123 connected through the link 124 to a first cross head 125. The cross head 125 is as shown in cross section in Figure 13 and is provided with journals 126 and 127 which serve to support the shaft 128 upon the outer ends of which additional grooved belt-forming pulleys 174 are mounted, the grooves of which are aligned with those of pulleys 173. The shaft 128 is not provided with a driving sprocket but is provided with slip rings 129 and 130 through which electricity is conducted to the heating elements mounted in the pulleys.

The cross head 125 is connected through a link 132 to the piston rod 133 of cylinder 134, the latter cylinder being mounted in a second cross head 135. The cross head 135 serves not only as a mounting for the cylinder 134 but is likewise provided with a pair of outwardly protruding stub shafts 137 and 138, and upon these shafts there are mounted flat grooved idler pulleys of which one such pulley 139 is illustrated in Figures 8 and 9, it being understood that there is a similar pulley upon the corresponding stub shaft at the opposite side of the machine.

The position of the cross head 135 relative to the cross head 125 is determined by the position of the piston operating in cylinder 134. As the piston rod 133 is projected relative to the cylinder 135, this causes the cross head 135 to be moved to the left, carrying cylinder 134 with it, since the piston 133 is anchored to the cross head 125 which is in turn anchored through the link 124 to the piston rod 123. Accordingly, the position of the two cross heads 125 and 135 is determined in the first instance by the position of the piston rod 123 operating in cylinder 122, and the position of cross head 135 relative to 125 is in addition determined by the position of piston rod 133 in cylinder 134.

Upon the rods 110—113 there is also mounted a third cross head 145 which likewise carries a cylinder 146 in which the piston rod 147 operates. The rod 147 is connected by link 148 to the frame piece 149 on the head frame member 109. The position of cross head 145 is accordingly determined by the operation of piston rod 147 connected to its piston in cylinder 146. The cross head 145 has the same cross sectional shape as for the cross head 135, namely that shown in Figure 12, and it is provided with stub shafts, one of which 141 is illustrated in Figures 8 and 9, it being understood that there is an axially aligned stub shaft at the opposite side of the frame. Stub shafts 141 and its opposite frame extension carry flat grooved idler pulleys, one of which 142 is shown in Figures 8 and 9.

Opposite ends of cylinder 122 are connected through flexible fluid supply lines 150 and 151 to a two-way valve 152 which is supplied with fluid under pressure by line 153, as indicated by the arrow 154. The valve 152 is provided with a long operating handle 155 which extends above the machine. When it is moved towards the position R, the piston is moved to the left, thereby permitting the release of the belts and the thin flexible band 30 from the pulleys. When the operating handle 155 is moved to the position S, the piston rod 123 is drawn to the right, thus applying the shaping action which drives the uncured belts into their pulleys during the shaping and curing operation. Similarly, fluid under pressure is applied as indicated by arrow 156 through the line 157 to the two-way valve 158 which is connected by means of lines 159 and 160 to opposite ends of the cylinder 134 and the valve 158 is likewise provided with a long operating handle 161 which extends above the machine. When the handle is moved to the position R, the piston and piston rod 133 move (relatively) toward the head of the cylinder 134, thus drawing the cylinder 134 to the right. This serves to shorten the distance between the centers of stub shafts 137—138 on cross head 135 and shaft 128 on cross head 125, thus likewise permitting release of the short belts when they are being cured as in Figure 8. As indicated by arrow 162, air is supplied through line 163 to the two-way valve 164 through which fluid under pressure passes through lines 165 and 166 to opposite ends of the cylinder 146. Valve 164 is likewise provided with a long operating handle 167 which when it is moved to the position R causes the air to be introduced to the cylinder 146 so as to move the piston rod 147 (relatively) towards the head of the cylinder 146, thus drawing the cylinder and cross-head 145 towards the head frame 109. This permits release of the short belts when they are being shaped and cured as shown in Figure 8. Extending lengthwise from the head frame 108 to 109 there is a longitudinal bar 168 which is apertured at intervals throughout its length to receive stop pins 170, 171 or 172 in order to predetermine the limit of movement of the various cross heads along the rods, it being noted that the bar 168 is in contact with the upper surface of not only the head frame members 108 and 109, but also the upper surface of each of the crossheads. Thus, by properly adjusting pins 170, 171 and 172, the position to which the cross heads are moved by their pistons and cylinders can be predetermined beforehand.

In Figures 8 and 9 the main belt forming pulleys are shown at 173 and 174, it being understood that there are counterparts of these pulleys at the opposite ends of the shaft 117 and 128, upon which these pulleys 173 and 174 are mounted. The pulleys 173 and 174 and corresponding pulleys at the opposite ends of their shafts are arranged to be heated electrically as described with reference to Figure 3, thermostatic control being provided for the electrical heaters, if desired. Likewise, if desired, there may be provided spaced plates 175 and 176, 177 and 178 for Figure 8 or spaced plates 179 and 180 for Figure 9 to which high frequency, high voltage electrical energy may be applied for heating the belts by diathermy action, in addition to the heat supplied by the forming pulleys. The heat supplied by the forming pulleys is sufficient for smaller cross sectional belts, but additional heat supplied electrically by the diathermy plates 175—180 serves to provide a rapid temperature rise for the deeper sections of the belt most remote from the heated pulley surfaces, and thus permits rapid curing without undue time on the machine.

The pulleys 139 and 142 of Figures 8 and 9 are idler pulleys, but it will be understood that they are provided with belt-forming grooves, the same as those for the larger belt-forming pulleys.

In operation the apparatus of Figures 8–13 may be used in either of several ways. When forming relatively short belts, the apparatus is used as shown in Figure 8. In this form the uncured belts in multiple are run over the pulleys 173 and 142 and other uncured belts are run over the pulleys 174 and 139. The pressure-applying thin flexible metallic band 30, however, runs over the pulleys 173 and 174. Thus, when pulley 173 is rotated through its driving sprocket 118, this serves to cause its rotation and the pressure-applying belt 130 which runs over the pulley 174 causes the rotation of the latter pulley which in turn rotates the pulley 139. In curing short belts as shown in Figure 8, the valve handle 155 is first moved to the release position which serves to move piston rod 123 to the left, as shown in Figure 10, thus moving cross head 125 to the left to permit release of the thin flexible metallic band 30 from all of the pulley grooves. The operating handles 161 and 167 are likewise moved to the release position. This, in each instance, moves the piston rod 133 or 137 towards its piston head, and the effect is to move the cross head 135 toward cross head 125 and the cross head 145 towards head frame 109, thus bringing the pulley 139 to its closed position relative to the large pulley 174 and the pulley 142 to its closed position relative to the large pulley 173. In this position the uncured belts which have been prefabricated as previously explained, are placed in the pulley grooves and the thin flexible metallic bands 30 are then placed in the grooves on top of the uncured belts and the operating handle 155 is moved first to shaping position. When this occurs the piston rod 123 moves to the right as shown in Figure 10 and draws the cross head 125 to the right, thus gradually forcing the thin flexible bands 30 downwardly in the groove in which, in each instance, they are operating, thereby gradually to move the uncured belt and meanwhile heated belt down into the groove and form it to the V shape. When the shaping of the belt is in progress, pulleys 139 and 142 run idle with little or no tension on the belts, which accordingly shape and begin to cure. Curing occurs first in the pad sections 13, as previously explained due to the greater shaping, thinner section and greater depth of contact with the pulley grooves. As curing is about to be completed in the pad sections, the operating handles 161 and 167 are moved to their stretching positions S (Figure 10) and this causes cross head 135 to be moved to the left, as shown in Figure 10, and causes a tension to be applied to the cord sections 10—11 of the belts B1 as they are cured. Similarly, piston rod 147 is moving outwardly from its cylinder 146, but since the piston rod is anchored through link 148 this causes the cross head 145 to move to the right and gradually place a tension on the belts B2 in which the cords in sections 10—11 are similarly tensioned. Additional heat input to the belts may be provided by means of the high frequency electrical heaters 175—176 and 177—178 to help curing of large belts. The limiting position of the cross head 125 to the right is determined by the stop pin 172, and the limiting positions of the cross heads 135 and 145 moving towards each other are determined by the stop pins 170—170. The positions of stop pins 170—170—172 are, of course, predetermined in accordance with the dimensions and design tensioning of the belts being produced. After the belts have been forced into the belt-shaping space of the pulley grooves, then tensioned and heated for a sufficient time, the material of which the belts are composed is adequately cured, whereupon the handles 155, 161 and 167 are all moved to the releasing position R, Figure 10, which slacks the tension throughout the machine and permits the belts and the thin flexible bands 30 to be removed.

If desired, the apparatus of Figure 8 may be utilized to cure belts by running them over pulleys 173 and 174 with or without traverse over the pulleys 139 and 142, as shown in Figure 9. Where the belts are not traversed over the pulleys 139 and 142, these portions of the apparatus serve no function and curing of the belt running on the pulleys 173 and 174 is accomplished as previously described with reference to the apparatus shown in Figures 1 and 3. Where exceptionally long belts are desired to be manufactured on a given size machine and in any event where separate and successive forming and tensioning are desired, the belts are run over idler pulleys 139' and 142' of Figure 9 which have flat bottom grooves therein. The shaping action is provided by the pulleys 173 and 174 primarily while the pulleys are held in such position as not appreciably to tension the belt. Then when vulcanization (curing) has been partially completed, the pulleys 139' and 142' are moved apart so as to apply tension to the belts and thus apply a predetermined (design) tension to the cords therein. While this is done the belts are continuously being run on the pulleys and vulcanization is completed. The stops 171 are, of course, positioned so that when cross-heads 135 and 145 are moved apart by air pressure appropriately applied, the belt will have a predetermined (design) length and the cords therein will be tensioned to the precise amount for best service. It may be noted that when the belts are run as in Figure 9, the movement of valve operating handles 161 and 167 is opposite from the direction of movement explained with reference to Figure 8, in order to place tension on the belts, or stated another way, the S and R positions of valves 158 and 164 are reversed for Figure 9 operation.

As many apparently widely different embodiments of this invention may be made without departing from the spirit and scope thereof, it is to be understood that I do not limit myself to the specific embodiments herein except as defined by the appended claims.

What I claim is:

1. An apparatus for making endless belts of heat curable material comprising a pair of pulleys each having therein a belt groove which has parallel side walls throughout a first portion of the groove depth, said parallel side walls being of a depth at least as great as the thickness of the belt to be formed thereon and a different cross-sectional shape below said spaced side wall portion which is the same cross section as that of the belt desired to be produced, means mounting the pulleys for rotation about substantially parallel axes, and for varying the distance between said axes as the pulleys are rotated, an endless thin flexible band having a width such that it fits neatly into the parallel side wall portions of the pulleys for running as a backing belt therein with the belt being manufactured pressed into the groove space below the band, and means for rotating the pulleys and for simultaneously heating the belt being manufactured.

2. The apparatus of claim 1 further characterized in that at least one of the pulleys is electrically heated.

3. The apparatus of claim 1 further characterized in that the means mounting the pulleys for rotation about substantially parallel axes and for varying the distance between said axes includes a cylinder and piston connected to the pulley mountings for moving them apart.

4. The apparatus of claim 1 further characterized in that the means mounting the pulleys for rotation about substantially parallel axes and for varying the distance between said axes includes a screw connection between said axes for preliminarily adjusting the distance between said axes and also includes a cylinder and piston for moving the axes further apart as the pulleys are rotated during curing belts thereon.

5. An apparatus for making endless belts of heat curable material comprising a frame, a shaft rotatably mounted on the frame, a second shaft mounted on the frame and substantially parallel to the first shaft, means for moving at least one shaft relative to the other while rotating and while maintaining their substantially parallel relationship, pulleys mounted on the shafts, each pulley having at least one groove therein aligned with a functionally identical groove of the other pulley, said grooves each having parallel side walls throughout a portion of their depth, said parallel side walls having a depth at least as great as the thickness of the belt to be formed thereon and a different cross-sectional shape below the parallel side wall portion which is the same cross-sectional shape as that of the belt desired to be produced, a thin flexible endless band having a width for running nicely between the parallel side walls of the pulleys, means for rotating at least one of the shafts and means for heating a belt being manufactured while it is run on the pulleys in the groove and beneath the thin flexible band.

6. The apparatus of claim 5 further characterized in that the shafts overhang the frame and the pulleys are mounted on the said overhanging shafts for easy mounting of the belts being manufactured and the endless band thereon.

7. The apparatus of claim 5 further characterized in that the opposite ends of the shafts overhang the frame at each side and each shaft has a multiple groove pulley at each end thereof for manufacture of a plurality of belts of identical size simultaneously thereon.

8. The apparatus of claim 5 further characterized in that a stop is provided for limiting the relative movement of the shafts away from each other.

9. The apparatus of claim 5 further characterized in that means is provided for preliminarily adjusting the parallel spacing of the shafts and in addition to the means for moving at least one of the shafts relative to the other while the shafts rotate.

10. The apparatus of claim 5 further characterized in that at least one of the pulleys is provided with electrical means for heating it.

11. The apparatus of claim 5 further characterized in that at least one of the pulleys is provided with electrical means for heating it and with thermostatic means for controlling the heat output of said electrical means for heating.

12. The apparatus of claim 5 further characterized in that it includes high-frequency electrical means for heating the belt being manufactured as it passes between the pulleys.

HENRY G. LYKKEN.

REFERENCES CITED

The following references are of record in the file of this patent:

UNITED STATES PATENTS

| Number | Name | Date |
|---|---|---|
| 1,969,067 | Freeman | Aug. 7, 1934 |
| 2,179,444 | Bierer | Nov. 7, 1939 |
| 2,195,125 | Smith et al. | Mar. 26, 1940 |
| 2,418,976 | Marcy | Apr. 15, 1947 |